Patented Dec. 18, 1951

2,579,320

UNITED STATES PATENT OFFICE 2,579,320

PROCESS FOR THE PREPARATION OF
3,4,7-TRIHALOQUINOLINES

Martin E. Hultquist, Bound Brook, and Theodore F. Scholz, South Plainfield, N. J., assignors to American Cyanamid Company, New York, N. Y., a corporation of Maine No Drawing. Application June 11, 1946,
Serial No. 676,088

8 Claims. (Cl. 260—283)

This invention relates to new chemical compounds and a process for preparing them. More particularly the compounds are 3-haloquinolines, having substituents in the 4 and 7 positions, which may be prepared by our methods by direct and comparatively simple and low priced procedures.

Compounds made in accordance with this invention may be designated by the formula

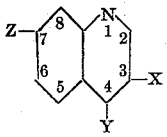

where

X is halogen.
Y is halogen or hydroxyl, and
Z is halogen, alkoxy or alkyl.

The reactivity of the halogen also opens up new fields of endeavor in the preparation of new and useful compounds. Our compounds are useful as pharmaceuticals and pharmaceutical intermediates, some of which possess antimalarial characteristics, in addition to other useful properties.

The presence of the halogen in the molecule affects the potency of certain antimalarial compounds.

The invention may be illustrated more clearly in detail by the following specific example:

Example 1

A reaction mixture containing sodium formylchloracetic ester is prepared by reacting together one mole each of methyl formate, sodium methylate and methyl monochloroacetate after the method described by Wislicenus, Berichte 43, 3530 (1910). The material as so prepared is diluted to 1.5 liters with ice. The thus chilled solution is then run slowly with stirring, into a mixture consisting of 1.5 liters of water, 100 grams of 36% hydrochloric acid, 127 grams of meta-chloroaniline and 500 grams of ice. When the two solutions have been mixed the white slurry is stirred for about an hour to insure completion of the reaction. The m-chloroanil is separated by filtration, washed with water and diluted alcohol. After drying, the yield of the pure anil is about 155 grams, or 75% of theoretical (M. P. 112.6–113.2° C.) The anil is N[2-carbomethoxy-2-chloroethylidine] m-chloroaniline,m-

or a tautomer thereof, but is more conveniently referred to as the m-chloroanil of formylchloracetic methyl ester.

100 grams of this m-chloroanil of formylchloroacetic ester is dissolved in 25 ml. of the eutectic mixture of biphenyl and diphenyl ether by warming to about 100° C. The warm solution is then added rapidly to 275 ml. of the same solvent heated to 245° C. The charge is heated to the boiling point (250–260° C.), and held for one-half hour at this temperature during which period a small amount of distillate is taken off. The charge is then cooled to 25 to 30° C. and stirred for sufficient time to allow complete crystallization of the product from the solution which is then removed by filtration. The dark presscake from the filter is washed with a small amount of a solvent such as benzene. The product is then purified by reslurrying in hot benzene. The product formed is 3,7-dichloro-4-hydroxyquinoline, which is comparatively insoluble in hot benzene and thus readily purified. After recrystallization the material is found to have a melting range of 313–315° C. (uncorrected).

The 3,7-dichloro-4-hydroxyquinoline may be converted practically quantitatively to 3,4,7 trichloroquinoline. 8.6 grams of the purified dichloro-hydroxyquinoline is added slowly to 61.2 grams of phosphorus oxychloride ($POCl_3$). The slurry is slowly heated in a water bath with stirring, the solid gradually going into solution. At about 85° C. the time required is about 25 minutes. The product is isolated by drowning the phosphorus oxychloride solution in water and ice. The slurry that results is neutralized with aqueous ammonia to a pH of 7.5 and the desired product filtered off and washed. The yield of crude material is about 95% of the theoretical quantity. After recrystallization from anhydrous ethanol, the material is found to have a melting range of 83.6–84.4° C.

Our process as exemplified above will operate with the sodium-formylbromoacetic ester, or other alkali formylhaloacetic ester but normally the chloroacetic ester is preferred because of economic considerations. The aniline should be substituted in the meta position to give the most desirable results. The meta substitutent may be chlorine, bromine, or other halogen or a methyl group or ethyl group or other low alkyl radical, or methoxy or ethoxy or other low alkoxy radical. The ester used is normally a sodium formylchloroacetic ester, preferably the methyl ester, however the ethyl ester or other low aliphatic ester may be used, as well as bromo, or other halogen.

Various solvents may readily be used for the ring closure step. Diphenyl ether, biphenyl, mineral oil, or mixtures may be used. The solvent, or vehicle should be relatively stable, to stand the temperature of the reaction, and is preferably of a comparatively high boiling point, although a more volatile solvent may be used in a pressure vessel. The solvent must be free from reactive groups such as hydroxy groups, ester groups, etc., which might react with one of the components of the mixture, or which might decompose under the reaction conditions.

The temperature at which the anil is heated to close the ring is important, but not particularly critical. By heating to about 300° C., as by using a different solvent, or an autoclave with the eutectic mixture, the ring closure will take place much more rapidly. If heated to only about 200° C., the ring closure takes place, but slowly. The time of heating must be correlated with the temperature in order that substantially all of the anil reacts, but still, the conditions are not sufficiently drastic to cause undue decomposition. The removal of the alcohol formed assists in stabilization of conditions. Closure at the temperature of boiling of the eutectic mixture, at atmospheric pressure, permits a most convenient and economical process. It is usually more efficient and economical to use from 2 to 50 parts of inert solvent per part of the anil in the ring closure step.

In our compounds the 3 and the 7 chloro linkages are comparatively stable. The chlorine in the 4 position alone reacts readily with amines under normal conditions, which allows the preparation of a 3, 7 halo substituted quinoline nucleus in various compounds.

We claim as our invention:

1. The process of preparing a 3,4,7-trihaloquinoline which comprises heating the reaction product of an alkali formylhaloacetic ester with a meta-haloaniline in an inert high boiling organic solvent to effect ring closure and halogenating the 4-hydroxyl group of the thus formed quinoline with a phosphorus oxyhalide.

2. The process of preparing 3,4,7-trichlorquinoline which comprises heating the reaction product of sodium formylchloroacetic ester with meta-chloroaniline in an inert high boiling organic solvent to effect ring closure, and chlorinating the 4-hydroxyl group of the thus formed quinoline with phosphorous oxychloride.

3. A method of preparing a 4-hydroxyquinoline of the formula:

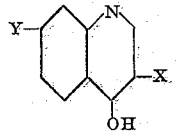

in which X and Y are halogens, which comprises heating in an inert liquid an anil which in one of its tautomeric forms has the formula:

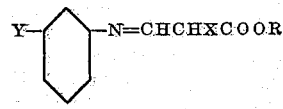

in which R is an alkyl radical, until ring closure occurs.

4. The process which comprises reacting sodium formylchloroacetic ester with meta-chloroaniline and condensing the thus formed meta-chloroanil by heating in an inert high boiling organic liquid to produce 3,7-dichloro-4-hydroxyquinoline.

5. The process which comprises heating the reaction product of an alkali formylchloroacetic ester with meta-chloroaniline in an inert high boiling organic liquid at a temperature of approximately 250° to 260° C. to produce 3,7-dichloro-4-hydroxyquinoline.

6. A method of preparing 3,7-di-halo-4-hydroxyquinoline which comprises heating a tautomeric form of N[-2(carboalkoxy) - 2 - haloethylidine] m-haloaniline in an inert solvent at a temperature between about 200° C. and 300° C. until said quinoline is formed.

7. A method of preparing 3,7-dichloro-4-hydroxyquinoline which comprises heating a tautomeric form of N[2(carboalkoxy)-2-chloroethylidine] m-chloroaniline in about 2 to 50 parts by weight of an inert solvent at a temperature within the range of 200° C. to 300° C. until said quinoline is formed.

8. A method of preparing 3,7-dichloro-4-hydroxy quinoline which comprises heating a tautomeric form of N[2(carbomethoxy) 2 chloroethylidine]m-chloroaniline in about 2 to 50 parts of an inert solvent at a temperature of about 250 to 260° C. until said quinoline is formed.

MARTIN E. HULTQUIST.
THEODORE F. SCHOLZ.

REFERENCES CITED

The following references are of record in the file of this patent:

UNITED STATES PATENTS

| Number | Name | Date |
|---|---|---|
| 2,233,970 | Andersag et al. | Mar. 4, 1941 |
| 2,478,125 | Northey et al. | Aug. 2, 1949 |

OTHER REFERENCES

Rabe et al.: Berichte, 64–B, 2487–2500 (1931).

Rubtsov, J.: Gen. Chem. (U. S. S. R.), vol. 7, 1885–1895 (1937).

Wiselogle: "Survey of Antimalarial Drugs, 1941–1945," vol. II, page 1048 (J. W. Edwards; Ann Arbor, Mich., 1946).

Buchmann et al.: J. Am. Chem. Soc., vol. 64, pp. 1357–1360 (1942).

Steck et al.: J. Am. Chem. Soc., vol. 68, pp. 129–132 (January 1946; received for publication November 13, 1944).

Beilstein: "Handbuch der Organischen Chemie" (4th ed.) (1935), vol. 20, page 362.

Beilstein: "Handbuch der Organischen Chemie" (4th ed.) (1935), vol. 20, pages 368–369.